(12) United States Patent
Thompson et al.

(10) Patent No.: US 10,996,727 B2
(45) Date of Patent: May 4, 2021

(54) SYSTEM AND METHOD OF MANAGING POWER IN INFORMATION HANDLING SYSTEM

(71) Applicant: Dell Products L.P., Round Rock, TX (US)

(72) Inventors: Richard C. Thompson, Cedar Park, TX (US); Karthikeyan Krishnakumar, Austin, TX (US)

(73) Assignee: Dell Products L.P., Round Rock, TX (US)

(*) Notice: Subject to any disclaimer, the term of this patent is extended or adjusted under 35 U.S.C. 154(b) by 61 days.

(21) Appl. No.: 15/959,840

(22) Filed: Apr. 23, 2018

(65) Prior Publication Data

US 2019/0324509 A1    Oct. 24, 2019

(51) Int. Cl.
*G06F 11/00* (2006.01)
*G06F 1/26* (2006.01)
*G06F 1/16* (2006.01)
*G06F 1/3231* (2019.01)

(52) U.S. Cl.
CPC ............ *G06F 1/263* (2013.01); *G06F 1/1613* (2013.01); *G06F 1/3231* (2013.01)

(58) Field of Classification Search
CPC .... G06F 1/1694; G06F 1/3203; G06F 1/3206; G06F 1/3212; G06F 1/3278; G06F 1/26; G06F 1/263; G06F 1/266; G06F 1/30; G06F 1/3234; G06F 1/3246; G06F 1/3287

See application file for complete search history.

(56) References Cited

U.S. PATENT DOCUMENTS

| | | | |
|---|---|---|---|
| 6,968,469 B1* | 11/2005 | Fleischmann | G06F 1/3228 713/324 |
| 7,311,526 B2 | 12/2007 | Rohrbach et al. | |
| 9,197,092 B2 | 11/2015 | Verdun et al. | |
| 2004/0034470 A1* | 2/2004 | Workman | G08B 13/1436 701/490 |
| 2007/0050772 A1* | 3/2007 | Ohara | G03G 15/5087 718/102 |

(Continued)

OTHER PUBLICATIONS

STMicroelectronics, "Basic Ranging Application Note", VL6180X, AN4545 Application Note, 2014; 27 pages. 2014.

(Continued)

*Primary Examiner* — Loan L.T. Truong
(74) *Attorney, Agent, or Firm* — Baker Botts L.L.P.

(57) ABSTRACT

In one or more embodiments, one or more systems, processes, and/or methods may determine that an external power supply coupling is coupled to an information handling system (IHS); may determine that power is not being received via the external power supply coupling; may, after determining that determining that power is not being received via the external power supply coupling, determine that a battery power supply of the IHS is able to power the IHS; may determine that a user is not present; may save a state of the IHS to a non-volatile memory medium; and may power down the IHS. In one or more embodiments, the one or more systems, processes, and/or methods may further receive power via the external power supply coupling; may power up the IHS; and may restore the state of the IHS from the non-volatile memory medium.

20 Claims, 8 Drawing Sheets

(56) References Cited

U.S. PATENT DOCUMENTS

| | | | |
|---|---|---|---|
| 2007/0061244 A1* | 3/2007 | Ramer | G06Q 10/10 705/37 |
| 2009/0089481 A1* | 4/2009 | Kapoor | G06F 12/0246 711/103 |
| 2010/0235667 A1* | 9/2010 | Mucignat | G06F 1/3203 713/323 |
| 2010/0244765 A1* | 9/2010 | Collopy | G06F 1/1624 320/103 |
| 2014/0108688 A1* | 4/2014 | Gulati | G06F 13/24 710/260 |
| 2014/0117945 A1* | 5/2014 | Verdun | H02J 7/082 320/162 |
| 2014/0320481 A1* | 10/2014 | Odio Vivi | G06F 1/1694 345/214 |
| 2015/0044964 A1* | 2/2015 | Khan | G06F 21/35 455/41.1 |
| 2015/0268719 A1* | 9/2015 | Li | G06F 3/013 345/156 |
| 2016/0105042 A1* | 4/2016 | Taylor | H01M 10/288 320/134 |
| 2016/0259649 A1* | 9/2016 | Poornachandran | G06F 9/4401 |
| 2016/0381233 A1* | 12/2016 | Xu | H04M 19/04 455/418 |
| 2017/0131766 A1* | 5/2017 | He | G06K 9/0061 |
| 2017/0269675 A1* | 9/2017 | Klacar | G06F 1/3215 |
| 2018/0307870 A1* | 10/2018 | Anson | G08B 21/24 |

OTHER PUBLICATIONS

RF Digital Corporation, "Simblee RFD77402 IoT 3D ToF Sensor Module RDF77402 Datasheet", www.Simblee.com, 2017; 38 pages. 2017.

Avago Technologies, "Digital Proximity, Ambient Light, RGB and Gesture Sensor," APDS-9960 Data Sheet, www.avagotech.com, 2013; 38 pages. 2013.

STMicroelectronics, "Proximity and ambient light sensing (ALS) module," VL6180X, 2014; 79 pages. 2014.

ON Semiconductor, "Passive Infrared (PIR) Detector Controller," NCS36000, www.onsemi.com, Dec. 2015; 8 pages. 2015.

Fairchild Semiconductor, "QRE1113, QRE113GR Minature Reflective Object Sensor," www.fairchildsemi.com, Aug. 2011; 8 pages. 2011.

Panasonic, "Infrared Array Sensor Grid-EYE," Apr. 2017; 6 pages. 2017.

STMicroelectronics, "A new generation, long distance ranging Time-of_Flight sensor based on ST' s FlightSense technology," VL53L1X, Feb. 2018; 35 pages. 2018.

Merriam-Webster, Webster's Third New International Dictionary Unabridged (Kindle Edition), 2017, Kindle Locations 797170-797187 and 797204-797209, Merriam-Webster, Inc. 2017.

* cited by examiner

SYSTEM AND METHOD OF MANAGING POWER IN INFORMATION HANDLING SYSTEM

BACKGROUND

Field of the Disclosure

This disclosure relates generally to information handling systems and more particularly to managing power in information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, processes, and/or methods may determine that an external power supply coupling is coupled to an information handling system; may determine that power is not being received via the external power supply coupling; may, after determining that power is not being received via the external power supply coupling, determine that a battery power supply of the information handling system is able to power the information handling system; may determine that a user is not present; may save a state of the information handling system to a non-volatile memory medium; and may power down the information handling system. In one or more embodiments, the one or more systems, processes, and/or methods may further, after the powering down the information handling system, receive power via the external power supply coupling; may, in response to receiving power via the external power supply coupling, power up the information handling system; and may restore the state of the information handling system from the non-volatile memory medium.

In one or more embodiments, determining that the user is not present may include determining that the user is not proximate to the information handling system. For example, determining that the user is not proximate to the information handling system may include determining that the user is not proximate to the information handling system via at least one of a light detection and ranging (LIDAR) device, a sound navigation and ranging (SONAR) device, a passive infrared device, a camera, a time-of-flight distance device, an eye tracking device, and a gesture determining device, among others. In one or more embodiments, determining that the user is not present may include at least one of: determining that a key of a keyboard of the information handling system has not been actuated within a first amount of time transpiring; determining that a pointing device of the information handling system has not been utilized within a second amount of time transpiring; determining, via a motion sensor of the information handling system, that the information handling has been stationary for a third amount of time transpiring, and determining that a lid of the information handling system is in a closed position for a fourth amount of time transpiring, among others. For example, the motion sensor may include at least one of an electronic gyroscope, an electronic accelerometer, an electronic magnetometer, and a Hall effect sensor, among others. In one or more embodiments, saving the state of the information handling system to the non-volatile memory medium may include at least one of saving at least one of a state of an operating system and saving one or more states of respective one or more applications, among others.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, an information handling system may include a battery power supply that may provide power to one or more components of the information handling system. For example, the battery power supply may include one or more batteries that may provide power to one or more components of the information handling system when an external power supply is not present or is not providing power to the information handling system. In one instance, the external power supply may provide power from a wall plug (e.g., 120 VAC). In another instance, the external power supply may provide power from a vehicle power supply (e.g., 12 VDC, a cigarette lighter, an inverter, etc.).

In one or more embodiments, a battery power supply may provide supplemental power when an external power supply is present and is providing power to the information handling system. In one example, a clock rate of a processor of the information handling system may increase when one or more demanding tasks and/or one or more demanding applications are being executed by the processor. For instance, the supplemental power from the battery power supply may aid and/or assist the external power supply in supporting a clock rate increase of the processor of the information handling system. In another example, a peripheral may be coupled to the information handling system. For instance, the supplemental power from the battery power supply may aid and/or assist the external power supply in providing power to the peripheral. In one or more embodiments, a battery power supply may provide power to the information handling system and an external power supply provides power in charging one or more batteries of the battery power supply.

In one or more embodiments, a power management plan may include powering down one or more components of an information handling system. In one or more embodiments, the information handling system may "sleep" after an amount of time transpiring (e.g., a user-settable amount of time). For example, the information handling system may transition to a low power mode. Even in a low power mode, a battery power supply may become depleted, according to one or more embodiments. In one or more embodiments, if a user is not utilizing the information handling system, the information handling system may be shutdown and/or powered down to conserve the battery power supply. For example, the information handling system may be shutdown and/or powered down before the battery power supply is depleted to a point where the battery power supply may no longer provide power to one or more components of the information handling system.

In one or more embodiments, one or more determinations may indicate that an information handling system should be shutdown. For example, an external power supply coupling may be coupled to an information handling system, but no power is being provided via the external power supply coupling. For instance, there may be no power being provided via an external power supply to the information handling system via the external power supply coupling. In one or more embodiments, determining that the external power supply coupling is coupled to the information handling system, but no power is being provided via the external power supply coupling, may indicate that the information handling system may be shutdown and/or powered down.

In one or more embodiments, determining that an information handling system is to be shutdown may be based at least on determining that an information handling system is no longer receiving power from an external power supply. In one example, the information handling system may be utilized with a vehicle power supply (e.g., 12 VDC, a cigarette lighter, an inverter, etc.). In one instance, a user of the information handling system may shutdown a vehicle, which may shutdown the vehicle power supply, while the user has a lunch break. In a second instance, a user of the information handling system may shutdown a vehicle, which may shutdown the vehicle power supply, while the user takes a weekend break, a vacation, and/or a holiday. In another instance, a user of the information handling system may shutdown a vehicle, which may shutdown the vehicle power supply, while the user attends to a matter (e.g., a cable television repair matter, a law enforcement matter, a delivery matter, etc.). In another example, the information handling system may be utilized with a wall plug (e.g., 120 VAC). In one instance, a user of the information handling system may take a break (e.g., a lunch break, a weekend break, a vacation, etc.) while a circuit breaker trips (e.g., a circuit breaker of a building, a circuit breaker of a power strip, a circuit breaker of a surge suppresser, a circuit breaker of a ground fault interrupter, etc.). In another instance, a user of the information handling system may take a break (e.g., a lunch break, a weekend break, a holiday, a vacation, etc.) while an external power supply is unplugged from a wall plug (e.g., 120 VAC).

In one or more embodiments, determining that an information handling system is to be shutdown may be based at least on determining that a user is not utilizing the information handling system. In one example, determining that a user is not utilizing the information handling system may be based at least on determining that an application is not launching (e.g., starting). In a second example, determining that a user is not utilizing the information handling system may be based at least on determining that a keyboard is not being utilized (e.g., keys are not being actuated). In a third example, determining that a user is not utilizing the information handling system may be based at least on determining that the information handling system is not being moved. In one instance, determining that the information handling system is not being moved may include determining, via one or more accelerometers, that the information handling system is not being moved. In another instance, determining that the information handling system is not being moved may include determining, via one or more gyroscopes, that the information handling system is not being moved. In a fourth example, determining that a user is not utilizing the information handling system may be based at least on determining that an operating system of the information handling system is not active. In a fifth example, determining that a user is not utilizing the information handling system may be based at least on determining that an application is not active. For instance, determining that a user is not utilizing the information handling system may be based at least on determining that a virus scan is not active and/or is not generating a report. In another example, determining that a user is not utilizing the information handling system may be based at least on determining that a user is not proximate to the information handling system. For instance, determining that a user is not proximate to the information handling system may include determining, via one or more proximity sensors, that a user is not proximate to the information handling system.

In one or more embodiments, determining that an information handling system is not to be shutdown may be based at least on determining that a user is utilizing the information handling system. In one example, determining that a user is utilizing the information handling system may be based at least on determining that an application is launching (e.g., starting). In a second example, determining that a user is utilizing the information handling system may be based at least on determining that a keyboard is being utilized (e.g., keys are being actuated). In a third example, determining that a user is utilizing the information handling system may be based at least on determining that the information handling system is being moved. In one instance, determining that the information handling system is being moved may include determining, via one or more accelerometers, that the information handling system is being moved. In another instance, determining that the information handling system is being moved may include determining, via one or more gyroscopes, that the information handling system is being moved. In a fourth example, determining that a user is utilizing the information handling system may be based at least on determining that an application is active. For instance, determining that a user is utilizing the information handling system may be based at least on determining that a virus scan is active and/or is generating a report. In another example, determining that a user is utilizing the information handling system may be based at least on determining that a user is proximate to the information handling system. For instance, determining that a user is proximate to the information handling system may include determining, via one or more proximity sensors, that a user is proximate to the information handling system.

Figure 1A:
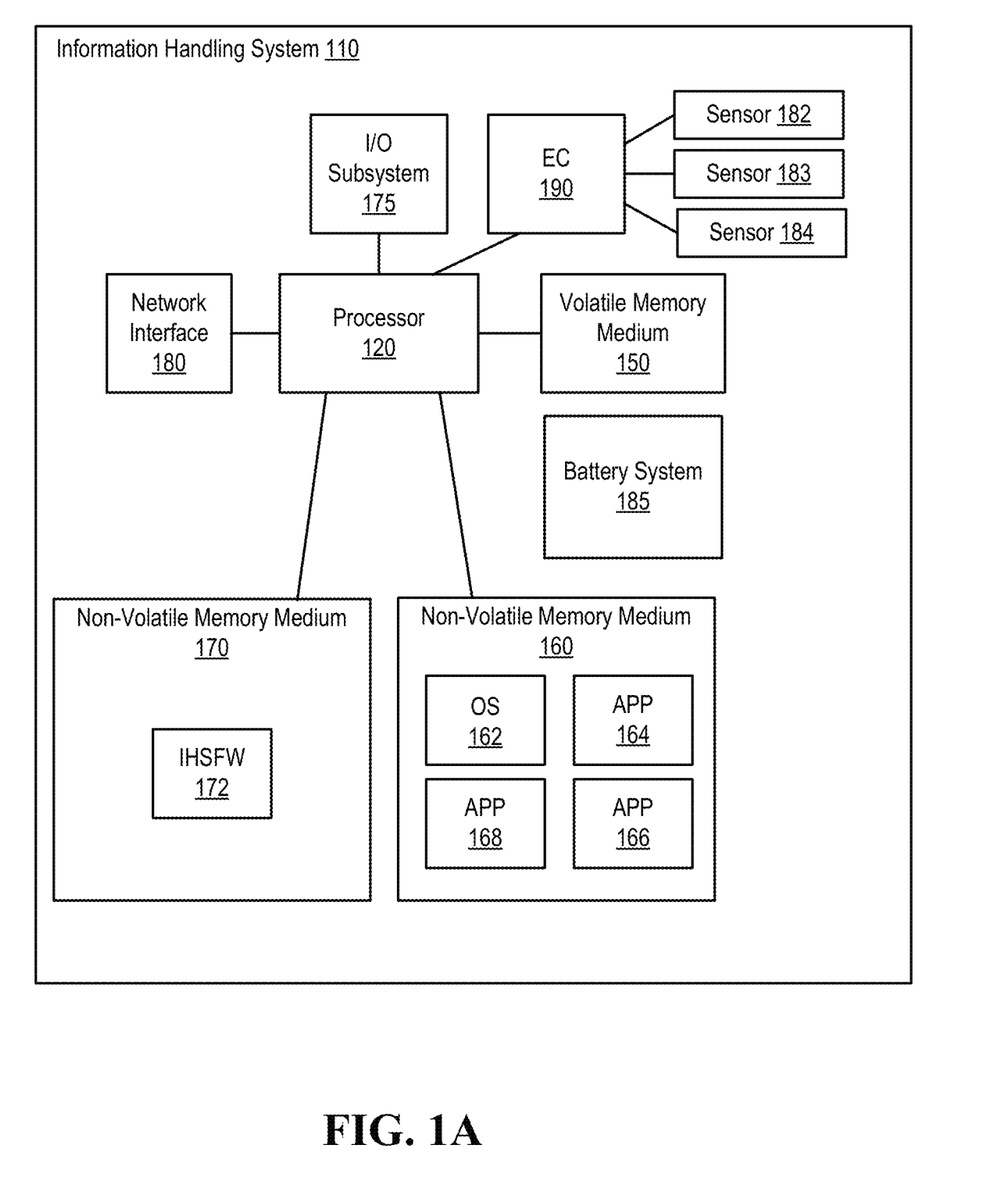
FIG. 1A illustrates an example of an information handling system, according to one or more embodiments.

Turning now to FIG. 1A, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, a network interface 180, sensors 182-184, a battery system 185, and an embedded controller (EC) 190. As illustrated, volatile memory medium 150, non-volatile memory media 160 and 170, I/O subsystem 175, network interface 180, and EC 190 may be communicatively coupled to processor 120. As shown, sensors 182-184 may be coupled to EC 190. In one or more embodiments, one or more of sensors 182-184 may include one or more of a Hall effect sensor, an electronic magnetometer, a motion sensor, a proximity sensor, an electronic accelerometer, an electronic gyroscope, a light detection and ranging (LIDAR) device, a sound navigation and ranging (SONAR) device, a passive infrared device, a camera, a time-of-flight distance device, an eye tracking device, and a gesture determining device, among other sensors. In one example, one or more of sensors 182-184 may be utilized in determining a change in an orientation of IHS 110. In a second example, one or more of sensors 182-184 may be utilized in determining a movement of IHS 110. In another example, one or more of sensors 182-184 may be utilized in determining if a user is proximate to IHS 110.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, flowcharts, methods, and/or processes described herein. In one example, processor 120 may execute processor instructions from one or more of memory media 150-170 in implementing one or more systems, flowcharts, methods, and/or processes described herein. In another example, processor 120 may execute processor instructions via network interface 180 in implementing one or more systems, flowcharts, methods, and/or processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, EC 190 may be or include a microcontroller. For example, the microcontroller may be or include an 8051 microcontroller, an ARM Cortex-M (e.g., Cortex-M0, Cortex-M0+, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, EC 190 may be or include one or more of a field programmable gate array (FPGA) and an ASIC, among others, configured, coded, and/or encoded with instructions in accordance with one or more of systems, flowcharts, methods, and/or processes described herein.

In one or more embodiments, processor 120 and one or more components of IHS 110 may be included in a system-on-chip (SoC). For example, the SoC may include processor 120 and a platform controller hub (not specifically illustrated). In one or more embodiments, IHS 110 may include a battery system 185. For example, battery system 185 may provide power from one or more batteries. In one instance, battery system 185 may provide power to one or more components of IHS 110. In another instance, battery system 185 may provide power to one or more peripherals coupled to IHS 110.

Figure 2:
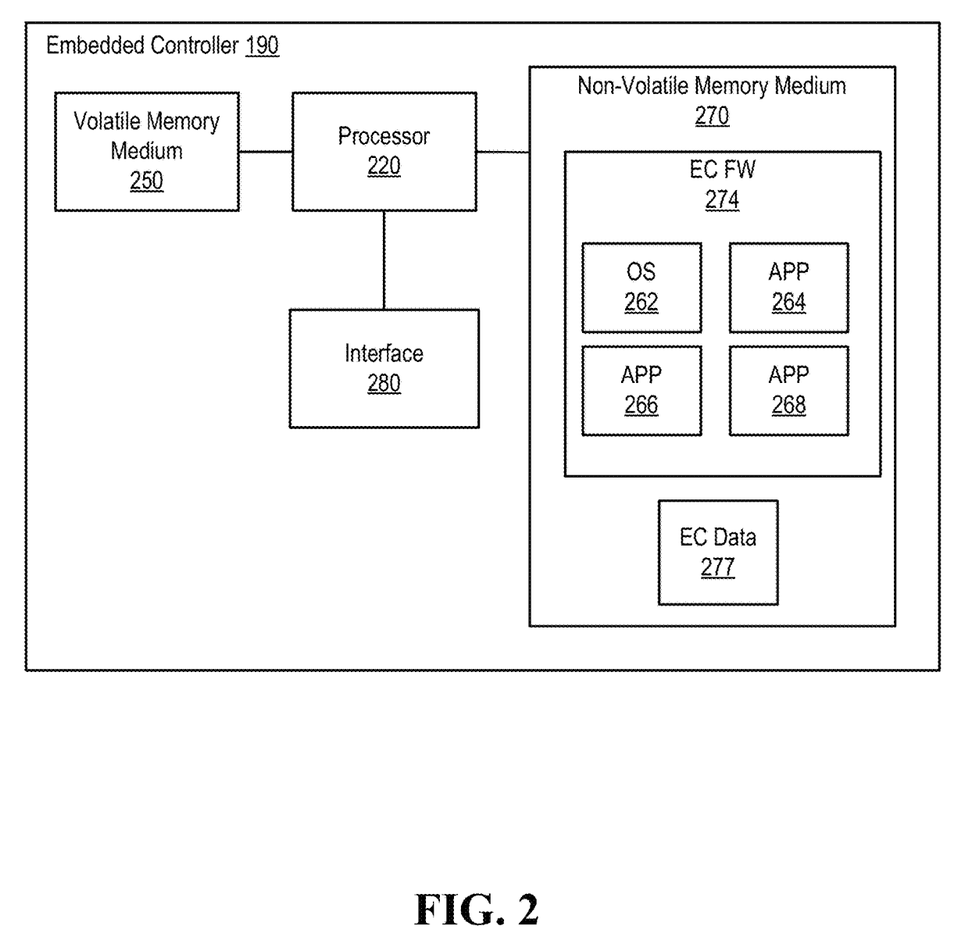
FIG. 2 illustrates an example embedded controller, according to one or more embodiments.

Turning now to FIG. 2, an example embedded controller is illustrated, according to one or more embodiments. As shown, EC 190 may include a processor 220, a volatile memory medium 250, a non-volatile memory medium 270, and an interface 280. As illustrated, non-volatile memory medium 274 may include an EC FW 274, which may include an OS 262 and APPs 264-268, and may include EC data 277. For example, OS 262 may be or include a real-time operating system (RTOS).

In one or more embodiments, interface 280 may include circuitry that enables communicatively coupling to one or more devices. In one example, interface 280 may include circuitry that enables communicatively coupling to one or more buses. In a second example, interface 280 may include circuitry that enables one or more interrupt signals to be received. In one instance, interface 280 may include general purpose input/output (GPIO) circuitry, and the GPIO circuitry may enable one or more interrupt signals to be received and/or provided via at least one interrupt line. In another instance, interface 280 may include GPIO circuitry that may enable EC 190 to provide and/or receive signals associated with other circuitry (e.g., diagnostic circuitry, etc.). In a third example, interface 280 may include circuitry that enables communicatively coupling to one or more networks. In one instance, interface 280 may include circuitry that enables communicatively coupling to network interface 180. In another example, interface 280 may include a network interface.

In one or more embodiments, one or more of OS 262 and APPs 264-268 may include processor instructions executable by processor 220. In one example, processor 220 may execute processor instructions of one or more of OS 262 and APPs 264-268 via non-volatile memory medium 270. In another example, one or more portions of the processor instructions of the one or more of OS 262 and APPs 264-268 may be transferred to volatile memory medium 250, and processor 220 may execute the one or more portions of the processor instructions of the one or more of OS 262 and APPs 264-268 via volatile memory medium 250. In one or more embodiments, processor 220 may execute instructions in accordance with one or more of systems, flowcharts, methods, and/or processes described herein. For example, non-volatile memory medium 270 and/or volatile memory medium 260 may store instructions that may be executable in accordance with one or more of systems, flowcharts, methods, and/or processes described herein. In one or more embodiments, processor 220 may utilize EC data 277. In one example, processor 220 may utilize EC data 277 via non-volatile memory medium 270. In another example, one or more portions of EC data 277 may be transferred to volatile memory medium 250, and processor 220 may utilize EC data 277 via volatile memory medium 250.

Figure 3:
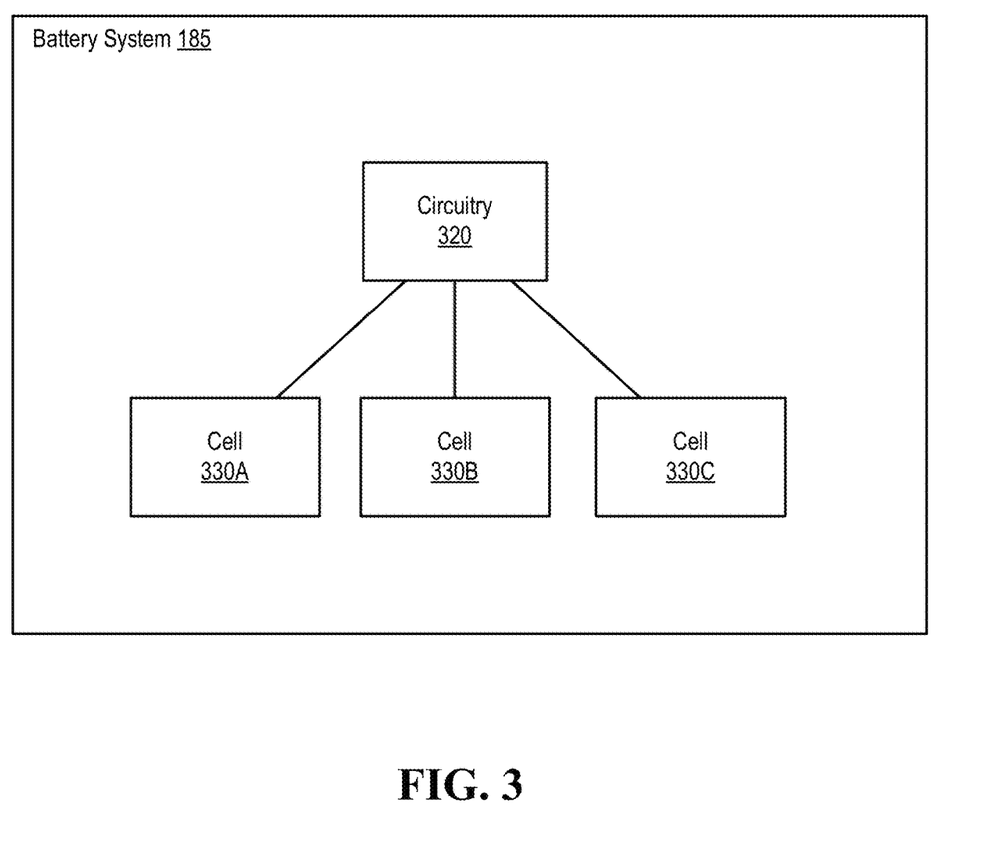
FIG. 3 illustrates an example of a battery system, according to one or more embodiments.

Turning now to FIG. 3, an example of a battery system is illustrated, according to one or more embodiments. As shown, battery system 185 may include circuitry 320 and cells 330A-330C (e.g., electrochemical cells, voltaic cells, etc.). In one or more embodiments, battery system 185 may be or include a battery power supply of IHS 110. In one example, battery system 185 may provide power to IHS 110. For instance, battery system 185 may provide power to one or more components of IHS 110. In a second example, battery system 185 may receive power from IHS 110. For instance, battery system 185 may receive power from an external power source via IHS 110. In another example, battery system 185 may communicate with IHS 110. For instance, battery system 185 may communicate with one or more of processor 120 and EC 190, among others.

In one or more embodiments, circuitry 320 may regulate and/or monitor charging and/or discharging of battery system 185. In one example, circuitry 320 may regulate charging and/or discharging of one or more of cells 330A-330C. In a second example, circuitry 320 may monitor charging and/or discharging. In another example, circuitry 320 may include a processor that may store information associated with charging and/or discharging of battery system 185 and/or may provide the information associated with charging and/or discharging of battery system 185. For instance, the information associated with charging and/or discharging of battery system 185 may be provided, by circuitry 320, to one or more of processor 120 and EC 190, among others.

In one or more embodiments, circuitry 120 may be or include a micro controller. In one example, the microcontroller may be or include an 8051 microcontroller, an ARM Cortex-M (e.g., Cortex-M0, Cortex-M0+, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In another example, the micro controller may execute instructions in accordance with one or more of systems, flowcharts, methods, and/or processes described herein. For instance, the micro controller may store instructions that may be executable in accordance with one or more of systems, flowcharts, methods, and/or processes described herein. In one or more embodiments, circuitry 320 may be or include one or more of a FPGA and an ASIC, among others, configured, coded, and/or encoded with instructions in accordance with one or more of systems, flowcharts, methods, and/or processes described herein. In one or more embodiments, circuitry 120 may include one or more structures and/or one or more functionalities of those described with reference to EC 190.

Figure 1B:
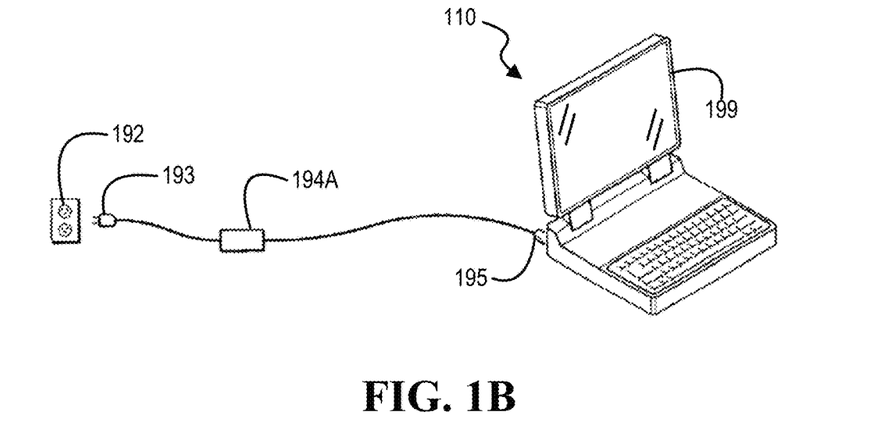
FIG. 1B illustrates an example of an information handling system coupled to an external power supply that can be coupled to a wall power outlet, according to one or more embodiments.
Figure 1C:
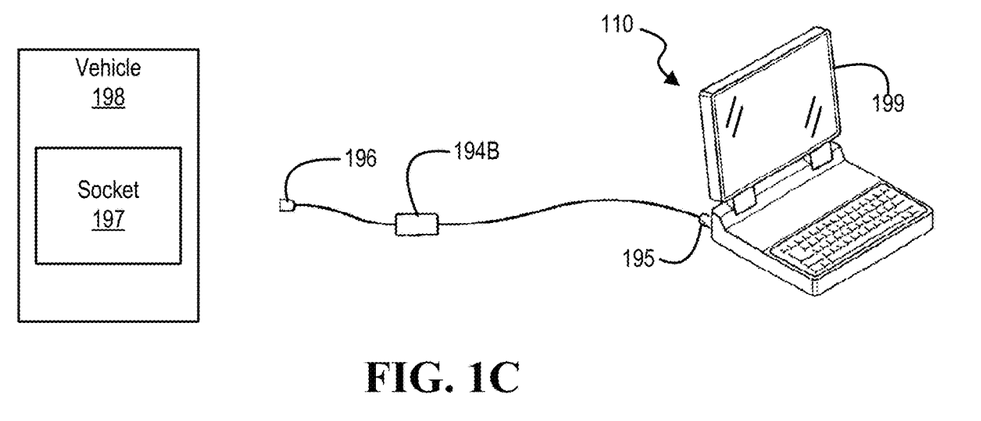
FIG. 1C illustrates another example of an information handling system coupled to an external power supply that can be coupled to a vehicle power outlet, according to one or more embodiments.
Figure 4A:
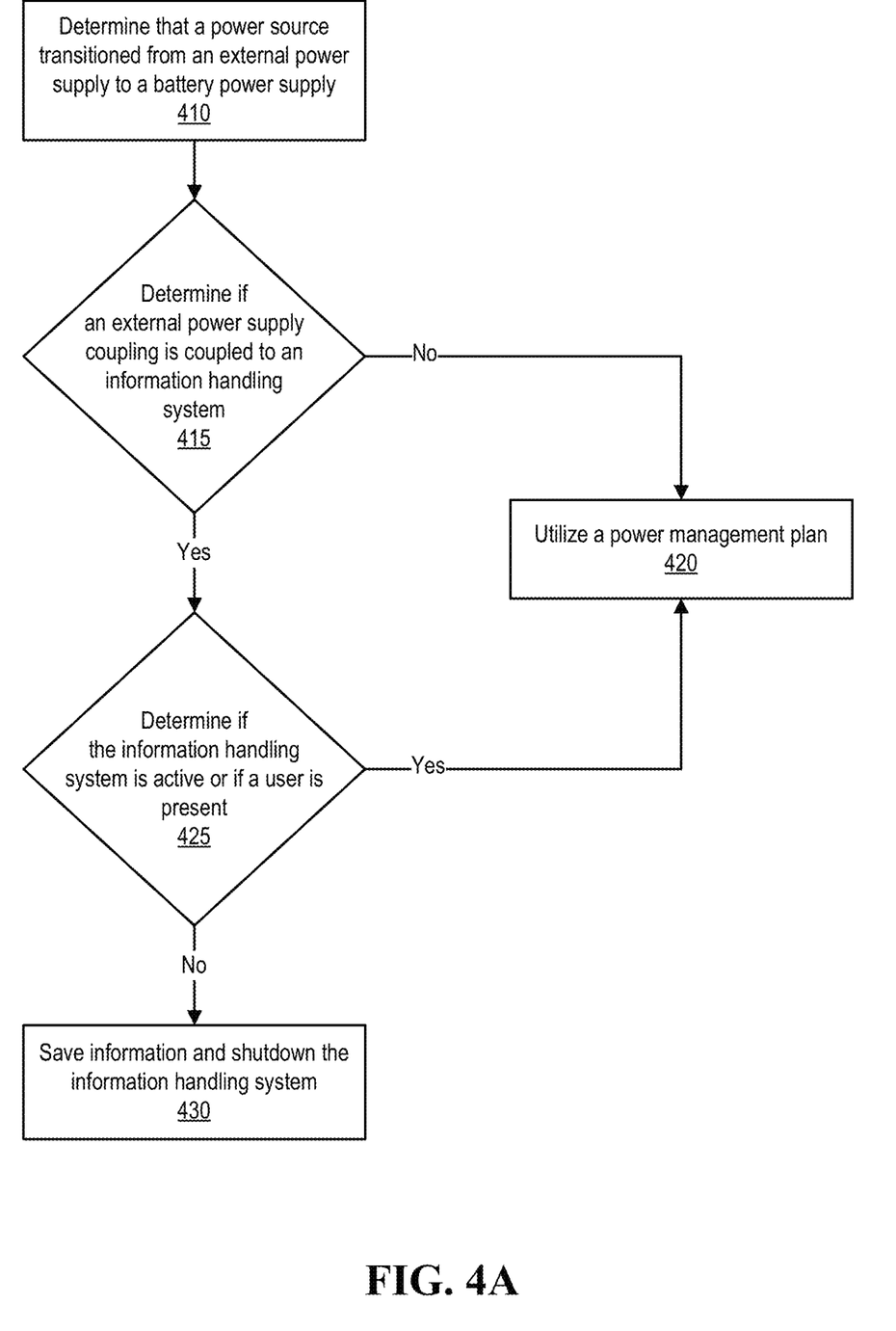
FIG. 4A illustrates an example of a method of operating an information handling system, according to one or more embodiments.

Turning now to FIG. 4A, an example of a method of operating an information handling system is illustrated, according to one or more embodiments. At 410, it may be determined that a power source transitioned from an external power supply to a battery power supply. For example, it may be determined that a power source transitioned from an external power supply 194 (illustrated in FIGS. 1B and 1C) to battery system 185. In one instance, external power supply 194A may be coupled to a wall plug 193, which may be plugged into a socket 192 (e.g., 120 VAC), illustrated in FIG. 1B. In another instance, external power supply 194B may be coupled to a plug 196, which may be plugged into a socket 197 (e.g., 12 VDC, a cigarette lighter, a USB-C port, etc.) of a vehicle 198, illustrated in FIG. 1C. In one or more embodiments, socket 197 may provide 120 VAC. In one or more embodiments, a vehicle may be or include one or more of an automobile, a truck, a police automobile, an ambulance, a fire truck, an airplane, a train, a boat, a ship, a submarine, an autonomous automobile, a tractor, an eighteen-wheeler tractor, a van, a delivery vehicle, and a bus, among others. In one or more embodiments, determining that a power source transitioned from an external power supply to a battery power supply may include determining that the information handling system is no longer receiving power from the external power supply. For example, determining that the information handling system is no longer receiving power from the external power supply may include determining that the information handling system is no longer receiving power via an external power supply coupling (e.g., an external power supply coupling 195).

At 415, it may be determined if an external power supply coupling is coupled to an information handling system. For example, it may be determined if an external power supply coupling 195 is coupled to IHS 110. In one instance, external power supply coupling 195 may be or include a barrel connector. In another instance, external power supply coupling 195 may be or include a plug that may rely on a magnetic force to maintain contact with IHS 110. In one or more embodiments, external power supply coupling 195 may be or include a USB coupling and/or connector. For example, the USB coupling and/or connector may be or include a USB type-C coupling and/or connector. Although external power supply coupling 195 is illustrated as a single external power supply coupling, external power supply coupling 195 may be or include multiple external power supply couplings, according to one or more embodiments. In one or more embodiments, two or more of the multiple external power supply couplings may be or include different multiple external power supply couplings. For example, a first external power supply coupling, of the two or more of the multiple external power supply couplings, may be or include a barrel connector, and a second external power supply coupling, of the two or more of the multiple external power supply couplings, may be or include a USB connector. In one or more embodiments, external power supply coupling 195 may be or include a custom external power supply coupling.

If the external power supply coupling is not coupled to the information handling system, the information handling system may utilize a power management plan, at 420. In one or more embodiments, the power management plan may include power management information that may be utilized in managing power distribution to one or more components of the information handling system. In one example, the power management information may be utilized in controlling a brightness of a display of the information handling system. In a second example, the power management information may be utilized in controlling power states of one or more non-volatile memory media. In another example, the power management information may be utilized in controlling sleep states of the information handling system.

In one or more embodiments, the external power supply coupling may be or include a multifunctional port. For example, the external power supply coupling may be or include a USB-C (e.g., USB type-C) coupling. For instance, the external power supply coupling may be present, but no power is being received via the external power supply coupling. In one or more embodiments, if the external power supply coupling is present and no power is being received via the external power supply coupling, it may be determined that the external power supply coupling is not present. For example, it may be determined that external power supply coupling is not effectively present.

If the external power supply coupling is coupled to the information handling system, it may be determined if the information handling system is active or if a user is present, at 425. If the information handling system is active or if a user is present, the information handling system may utilize the power management plan, at 420. In one example, determining if the information handling system is active may include determining if an application is launching. In a second example, determining if the information handling system is active may include determining if an operating system is active. In a third example, determining if a user is present may include determining if a key of a keyboard of the information handling system was actuated within a first amount of time transpiring. In a fourth example, determining if a user is present may include determining if the information handling system was moved within a second amount of time transpiring. In one instance, determining if the information handling system was moved within the second amount of time transpiring may include determining one or more accelerations, via one or more electronic accelerometers, within the second amount of time transpiring. In another instance, determining if the information handling system was moved within the second amount of time transpiring may include determining one or more orientation changes, via one or more electronic gyroscopes, within the second amount of time transpiring.

In a fifth example, determining if a user is present may include determining if a pointing device (e.g., a mouse, a trackpad, a trackball, a touch screen, etc.) of the information handling system has been utilized within a third amount of time transpiring. In a sixth example, determining if a user is present may include providing information and determining if the user responds to the information within fourth amount of time transpiring. In one instance, the information may be or include visual information (e.g., a pop-up message). In another instance, the information may be or include audible information (e.g., an alert sound, one or more audible words, etc.). In another example, determining if a user is present may include determining if the user is proximate to the information handling system within a fifth amount of time transpiring. For instance, determining if the user is proximate to the information handling system within the fifth amount of time transpiring may include determining, via one or more proximity sensors, that the user is proximate to the information handling system within the fifth amount of time transpiring. In one or more embodiments, one or more of the proximity sensors may include one or more of a LIDAR device, a SONAR device, a passive infrared device, a camera, a time-of-flight distance device, an eye tracking device, and a gesture determining device, among others.

If the information handling system is not active and if a user is not present, information may be saved and the information handling system may be shutdown, at 430. In one or more embodiments, saving information prior to a shutdown of the information handling system may include saving one or more states of the information handling system. In one example, a state of IHS 110 may be saved to non-volatile memory medium 160. In one instance, a state of IHS 110 may include a state of OS 162. In another instance, a state of IHS 110 may include a state executing one or more applications (e.g., one or more of APPs 164-168). In another example, saving the state of the information handling system may include at least one of saving a state of an operating system and saving one or more states of respective one or more applications.

Figure 4B:
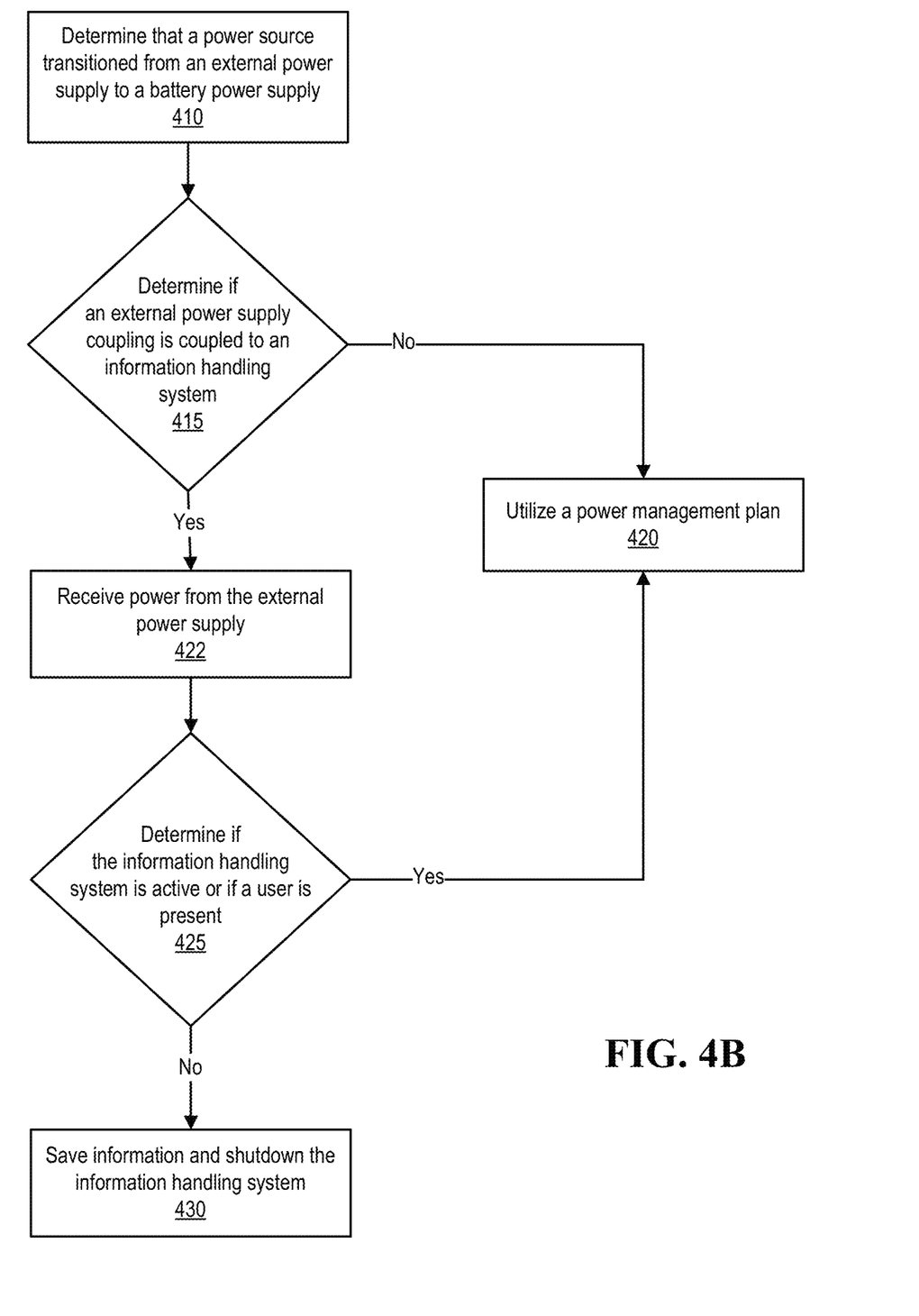
FIG. 4B illustrates a second example of a method of operating an information handling system, according to one or more embodiments.

Turning now to FIG. 4B, a second example of a method of operating an information handling system is illustrated, according to one or more embodiments. In one or more embodiments, method elements 410-420, 425, and 430 of FIG. 4B may be performed in accordance with method elements 410-420, 425, and 430 of FIG. 4A. In one or more embodiments, if the external power supply coupling is coupled to the information handling system, power may be received via the external power supply coupling, at 422. The method may proceed to 425, according to one or more embodiments.

Figure 5A:
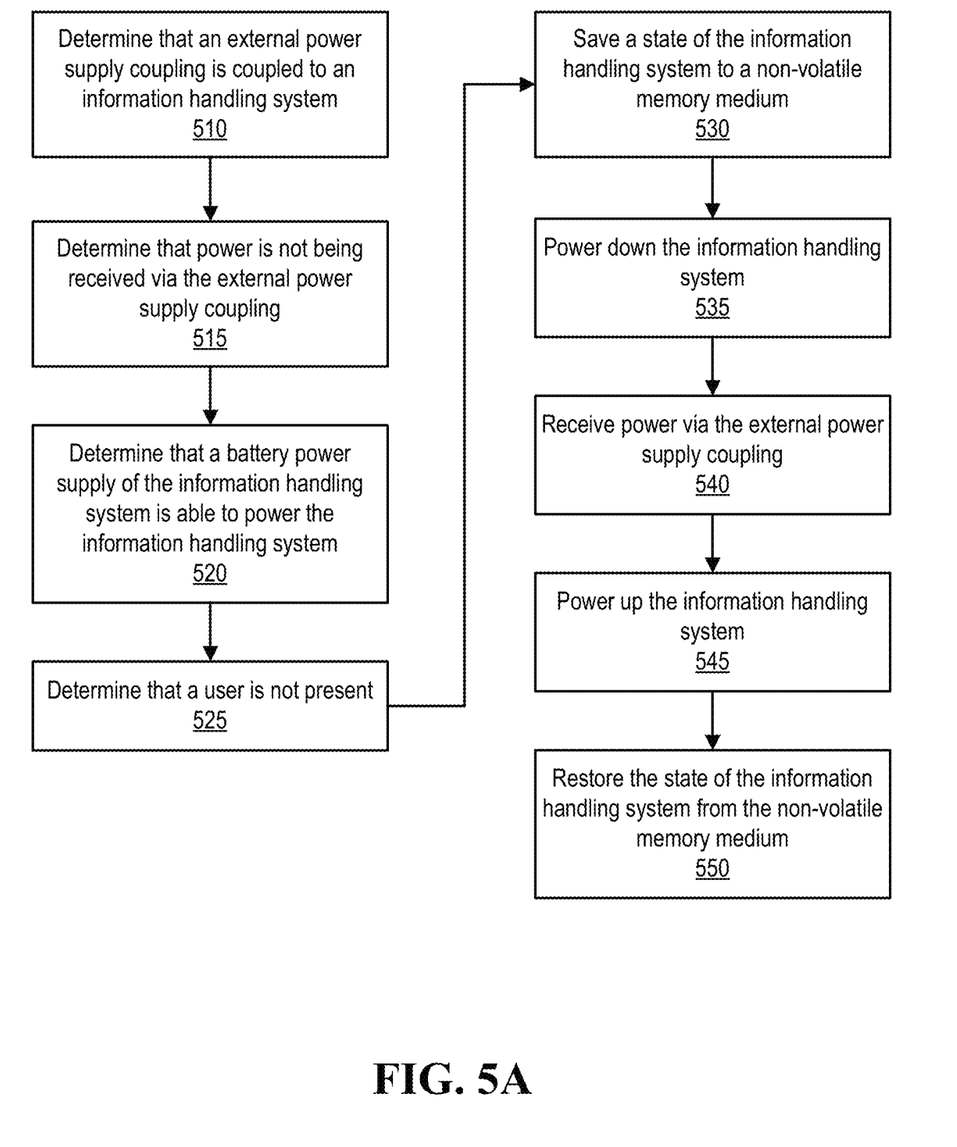
FIG. 5A illustrates a third example of another method of operation an information handling system, according to one or more embodiments.

Turing now to FIG. 5A, a third example of another method of operation an information handling system is illustrated, according to one or more embodiments. At 510, it may be determined that an external power supply coupling is coupled to an information handling system. For example, it may be determined that external power supply coupling 195 is coupled to IHS 110. At 515, it may be determined that power is not being received via the external power supply coupling. For example, it may be determined that power is not being received via external power supply coupling 195. For instance, determining that power is not being received via external power supply coupling 195 may include determining that power is not being received from external power supply 194. Although external power supply coupling 195 is illustrated as a single external power supply coupling, external power supply coupling 195 may be or include multiple external power supply couplings, according to one or more embodiments. For example, determining that power is not being received via external power supply coupling 195 may include determining that power is not being received from multiple external power supply couplings. For instance, determining that power is not being received via external power supply coupling 195 may include determining that power is not being received from a minimum number of multiple external power supply couplings to avoid depleting the battery power supply. In one or more embodiments, two or more of the multiple external power supply couplings may be or include different multiple external power supply couplings. For example, a first external power supply coupling, of the two or more of the multiple external power supply couplings, may be or include a barrel connector, and a second external power supply coupling, of the two or more of the multiple external power supply couplings, may be or include a USB connector. In one or more embodiments, external power supply coupling 195 may be or include a custom external power supply coupling.

In one or more embodiments, the information handling system may be utilized with a vehicle power supply (e.g., 12 VDC, a cigarette lighter, an inverter, a USB-C port, etc.). In one example, a user of the information handling system may shutdown a vehicle, which may shutdown the vehicle power supply, while the user has a lunch break. In a second example, a user of the information handling system may shutdown a vehicle, which may shutdown the vehicle power supply, while the user takes a weekend break, a vacation, and/or a holiday. In another example, a user of the information handling system may shutdown a vehicle, which may shutdown the vehicle power supply, while the user attends to a matter (e.g., a cable television repair matter, a law enforcement matter, a delivery matter, etc.). In one or more embodiments, the information handling system may be utilized with a wall plug (e.g., 120 VAC). In one example, a user of the information handling system may take a break (e.g., a lunch break, a weekend break, a holiday, a fire drill, a vacation, etc.) while a circuit breaker trips (e.g., a circuit breaker of a building, a circuit breaker of a power strip, a circuit breaker of a surge suppresser, a circuit breaker of a ground fault interrupter, etc.). In another example, a user of the information handling system may take a break (e.g., a lunch break, a weekend break, a holiday, a vacation, a fire drill, etc.) while an external power supply is unplugged from a wall plug (e.g., 120 VAC).

At 520, it may be determined that a battery power supply of the information handling system is able to power the information handling system. For example, it may be determined that battery system 185 is able to power IHS 110. For instance, determining that battery system 185 is able to power IHS 110 may include determining that battery system 185 is able to power one or more components of IHS 110. In one or more embodiments, determining that the battery power supply of the information handling system is able to power the information handling system may be performed after determining that power is not being received via the external power supply coupling.

Figure 1D:
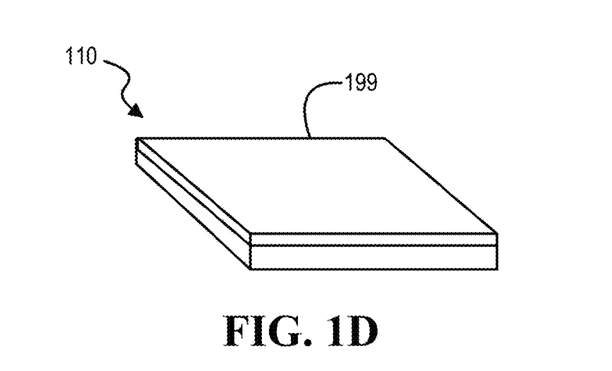
FIG. 1D illustrates another example of an information handling system with a lid in a closed position, according to one or more embodiments.

At 525, it may be determined that a user is not present. In one or more embodiments, determining that the user is not present may include determining that the user is not proximate to the information handling system. For example, determining that the user is not proximate to the information handling system may include determining that the user is not proximate to the information handling system via at least one of a LIDAR device, a SONAR device, a passive infrared device, a camera, a time-of-flight distance device, an eye tracking device, and a gesture determining device, among others. In one or more embodiments, determining that the user is not present may include at least one of determining that a key of a keyboard of the information handling system has not been actuated within a first amount of time transpiring, determining that a pointing device (e.g., a mouse, a trackpad, a trackball, a touch screen, etc.) of the information handling system has not been utilized within a second amount of time transpiring, determining, via a motion sensor (e.g., an electronic gyroscope, an electronic accelerometer, etc.) of the information handling system, that the information handling has been stationary for a third amount of time transpiring, and determining that a lid of the information handling system is in a closed position for a fourth amount of time transpiring, among others. For example, a lid 199 of IHS 110 may be closed (illustrated in FIG. 1D) for the fourth amount of time transpiring. For instance, a user may close lid 199 and store IHS 110 for traveling without shutting down IHS 110 prior to closing close lid 199 and storing IHS 110 for traveling.

At 530, a state of the information handling system may be saved to a non-volatile memory medium. In one example, a state of IHS 110 may be saved to non-volatile memory medium 160. In one instance, a state of IHS 110 may include a state of OS 162. In another instance, a state of IHS 110 may include a state executing one or more applications (e.g., one or more of APPs 164-168). In another example, saving the state of the information handling system may include at least one of saving a state of an operating system and saving one or more states of respective one or more applications. At 535, the information handling system may be powered down. In one or more embodiments, powering down the information handling system may include shutting down the information handling system. For example IHS 110 may be powered down.

At 540, power may be received via the external power supply coupling. For example, it may be determined that power is being received via external power supply coupling 195. For instance, determining that power is being received via external power supply coupling 195 may include determining that power is being received from external power supply 194. In one or more embodiments, power may be received via the external power supply coupling after the information handling system is powered down. At 545, the information handling system may be powered up. For example, IHS 110 may be powered up. In one or more embodiments, the information handling system may be powered up in response to receiving power via the external power supply coupling. At 550, the state of the information handling system may be restored from the non-volatile memory medium. For example, the state of IHS 110 saved to non-volatile memory medium 160 may be restored. In one instance, the state of OS 162 may be restored. In another instance, the state of executing one or more applications (e.g., one or more of APPs 164-168) may be restored. In one or more embodiments, restoring the state of the information handling system may include restoring the information handling system to its operating state when the user left the information handling system or when the information handling system was powered down.

Figure 5B:
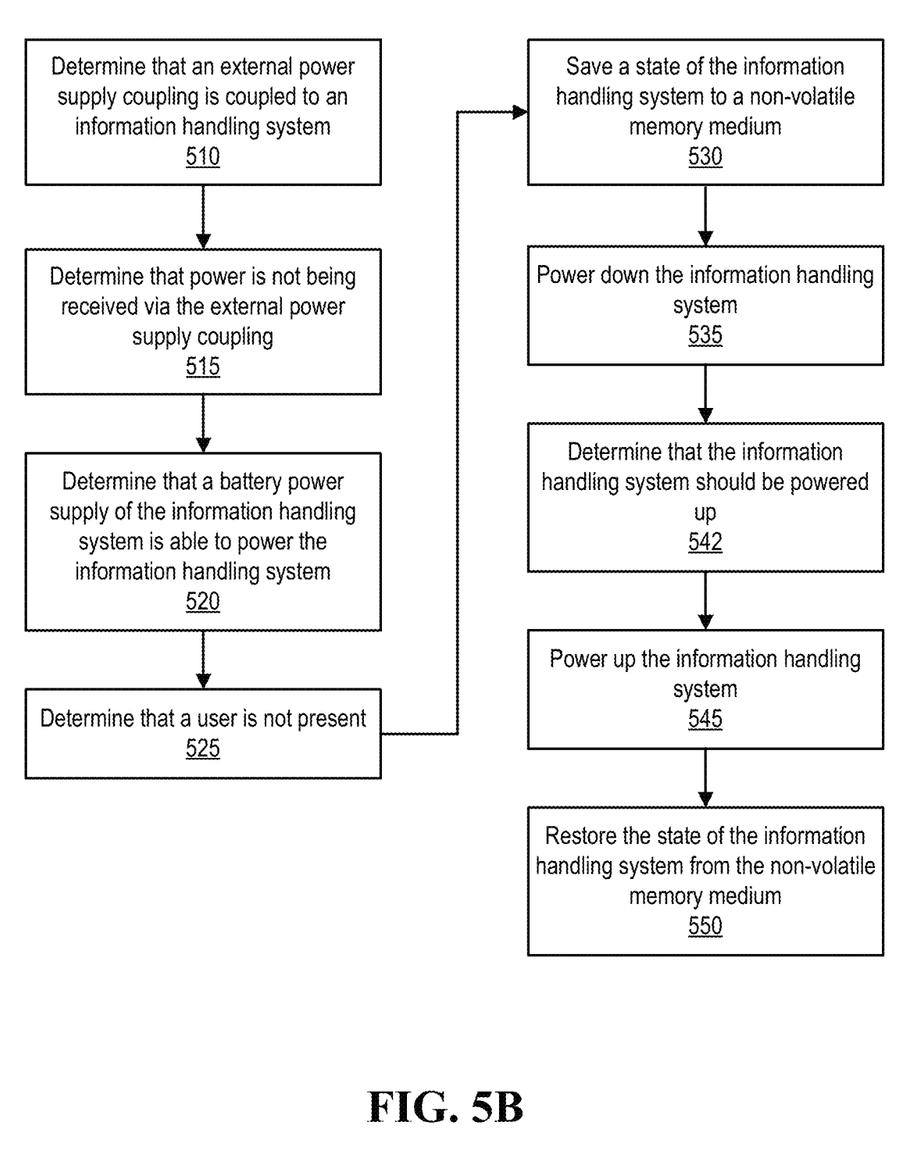
FIG. 5B illustrates another example of another method of operation an information handling system, according to one or more embodiments.

Turing now to FIG. 5B, another example of another method of operation an information handling system is illustrated, according to one or more embodiments. In one or more embodiments, method elements 510-535, 545, and 550 of FIG. 5B may be performed in accordance with method elements 510-535, 545, and 550 of FIG. 5A. In one or more embodiments, it may be determined that the information handling system should be powered up, at 542. In one or more embodiments, determining that the information handling system should be powered up may include determining that a wake-on-LAN has been triggered and/or determining that a wake-on-LAN event has been received. For example, IHS 110 may receive network traffic. In one instance, the network traffic may be addressed to IHS 110. In another instance, the network traffic may be or include broadcast network traffic.

In one or more embodiments, determining that the information handling system should be powered up may be based at least on a probability and/or a likelihood that a user may utilize the information handling system. In one example, determining that the information handling system should be powered up may be based at least on a scheduled calendar event for a user of the information handling system. For instance, it may be determined that the information handling system should be powered up an amount of time before or at a time of a scheduled calendar event of the user of the information handling system. In another example, a running average of start times and/or end times for the user utilizing the information handling system may be determined. For instance, the probability and/or the likelihood that the user may utilize the information handling system may be based at least one the running average of start times and/or end times. In one or more embodiments, one or more of the running average of start times and/or end times may be compensated for a change in time zone and/or a daylight savings time. For example, the user may travel with the information handling system to a different time zone.

In one or more embodiments, a beginning of day and an end of day may be determined. For example, a user involved turn-on of the day and last user involved turn-off of the day may be determined. In one or more embodiments, determining turn-on and turn-off values may vary based at least on an information handling system usage model and/or different operating system conditions such as the Smart Connect operating feature by Intel and the Connected Standby operating feature by Microsoft. In one or more embodiments, one or more power states for a graphics controller (also referred to as a graphics processor unit (GPU)) of the information handling system may be utilized as a user present usage indication for one or more purposes of battery power supply management. For example, a graphics controller turn-on of day and a last graphics controller turn-off of day may be tracked as indications of user turn-on and turn-off events. In one or more embodiments, state transitions, such as an ACPI S0 state transition, may identify a first and last use of a day. Other operating systems and/or usages may have alternate and/or other methods of determining user turn on and turn off events, according to one or more embodiments.

In one or more embodiments, a connected standby condition may be present. For example, utilizing a connected standby condition, an operating system may not leave the S0 state. For instance, the connected standby condition may be or include a pseudo S3 S4 state condition and, as such, may have devices put into run time D3. In one or more embodiments, the information handling system may be placed into a system into runtime D3 during a connected standby condition, and a status associated with runtime D3, among others, may be provided to an embedded controller of the information handling system. For example, the status may indicate one or more user present on-off events, among others. For instance, one or more power button actuations and/or one or more lid closing and opening operations may cause one or more standby conditions. In one or more embodiments, a beginning of day may be determined based at least on a first power button press or lid open event of the day (or the first display turn on of the day). In one or more embodiments, an end of the day may be determined based at least on a last power button press or lid close event of the day (or the last display turn off of the day).

In one or more embodiments, determining that the information handling system should be powered up may based at least on one or more remote management capabilities. For example, individual and/or group battery management policies may be configured. For instance, a particular usage profile may configure particular beginning of day and end of day values, and/or can disable user control of one or more information handling system configurable functions. In one or more embodiments, an administrator may provide battery management policies to the information handling system. For example, the administrator may remotely provide battery management policies to the information handling system.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   at least one processor;
   at least one sensor, coupled to the at least one processor, that includes at least one of a light detection and ranging (LIDAR) device, a sound navigation and ranging (SONAR) device, a camera, and a time-of-flight distance device;
   a battery power supply; and
   a memory medium that is coupled to the at least one processor and that stores instructions, when executed by the at least one processor, cause the information handling system to:
     determine that an external power supply coupling is coupled to the information handling system;
     determine that power is not being received via the external power supply coupling;
     after determining that the external power supply coupling is coupled to the information handling system and after determining that power is not being received via the external power supply coupling, determine that the battery power supply of the information handling system is able to power the information handling system;
     determine, via the at least one of the LIDAR device, the SONAR device, the camera, and the time-of-flight distance device, that a user is not proximate to the information handling system and determine that an application is not active to determine that the user is not present; and
     after determining that the battery power supply of the information handling system is able to power the information handling system and after determining that the user is not present:
       save a state of the information handling system to a non-volatile memory medium; and
       shut down the information handling system.

2. The information handling system of claim 1, wherein the instructions further cause the information handling system to:
   after shutting down the information handling system, receive power via the external power supply coupling;
   in response to receiving power via the external power supply coupling, power up the information handling system; and
   restore the state of the information handling system from the non-volatile memory medium.

3. The information handling system of claim 1,
   wherein the sensor further includes at least one of a passive infrared device and a gesture determining device; and
   wherein, to determine that the user is not proximate to the information handling system, the instructions further cause the information handling system to determine that the user is not proximate to the information handling system via at least one of the passive infrared device and the gesture determining device.

4. The information handling system of claim 1, wherein, to determine that the user is not present, the instructions further cause the information handling system to:
   determine that a key of a keyboard of the information handling system has not been actuated within a first amount of time transpiring;
   determine that a pointing device of the information handling system has not been utilized within a second amount of time transpiring;
   determine, via a motion sensor of the information handling system, that the information handling has been stationary for a third amount of time transpiring; or
   determine that a lid of the information handling system is in a closed position for a fourth amount of time transpiring.

5. The information handling system of claim 4, wherein the motion sensor includes at least one of an electronic gyroscope, an electronic accelerometer, an electronic magnetometer, and a Hall effect sensor.

6. The information handling system of claim 1, wherein, to save the state of the information handling system to the non-volatile memory medium, the instructions further cause the information handling system to save at least one of a state of an operating system or save one or more states of respective one or more applications.

7. A method, comprising:
   determining that an external power supply coupling is coupled to an information handling system;
   determining that power is not being received via the external power supply coupling;
   after the determining that the external power supply coupling is coupled to the information handling system and after the determining that determining that power is not being received via the external power supply coupling, determining that a battery power supply of the information handling system is able to power the information handling system;
   determining that a user is not present via determining that the user is not proximate to the information handling system via a sensor that includes at least one of a light detection and ranging (LIDAR) device, a sound navigation and ranging (SONAR) device, a camera, and a time-of-flight distance device and determining that an application is not active; and
   after the determining that the battery power supply of the information handling system is able to power the information handling system and after the determining that the user is not present:
     saving a state of the information handling system to a non-volatile memory medium; and
     shutting down the information handling system.

8. The method of claim 7, further comprising:
   after the shutting down the information handling system, receiving power via the external power supply coupling;
   in response to the receiving power via the external power supply coupling, powering up the information handling system; and
   restoring the state of the information handling system from the non-volatile memory medium.

9. The method of claim 7, wherein the sensor further includes at least one of a passive infrared device and a gesture determining device.

10. The method of claim 7, wherein the determining that the user is not present includes at least one of:

determining that a key of a keyboard of the information handling system has not been actuated within a first amount of time transpiring;

determining that a pointing device of the information handling system has not been utilized within a second amount of time transpiring;

determining, via a motion sensor of the information handling system, that the information handling has been stationary for a third amount of time transpiring; and determining that a lid of the information handling system is in a closed position for a fourth amount of time transpiring.

11. The method of claim 10, wherein the motion sensor includes at least one of an electronic gyroscope, an electronic accelerometer, an electronic magnetometer, and a Hall effect sensor.

12. The method of claim 7, wherein the saving the state of the information handling system to the non-volatile memory medium includes at least one of saving at least one of a state of an operating system and saving one or more states of respective one or more applications.

13. A computer-readable non-transitory memory medium that includes processor instructions that, when executed by at least one processor of an information handling system, cause the information handling system to:

determine that an external power supply coupling is coupled to the information handling system;

determine that power is not being received via the external power supply coupling;

after determining that the external power supply coupling is coupled to the information handling system and after determining that power is not being received via the external power supply coupling, determine that a battery power supply of the information handling system is able to power the information handling system;

determine, via at least one of a light detection and ranging (LIDAR) device, a sound navigation and ranging (SONAR) device, a camera, and a time-of-flight distance device, that a user is not proximate to the information handling system and determine that an application is not active to determine that the user is not present; and after determining that the battery power supply of the information handling system is able to power the information handling system and after determining that the user is not present:

save a state of the information handling system to a non-volatile memory medium; and shut down the information handling system.

14. The computer-readable non-transitory memory medium of claim 13, wherein the processor instructions further cause the information handling system to:

after shutting the information handling system, receive power via the external power supply coupling;

in response to receiving power via the external power supply coupling, power up the information handling system; and restore the state of the information handling system from the non-volatile memory medium.

15. The computer-readable non-transitory memory medium of claim 13, wherein, to determine that the user is not proximate to the information handling system, the processor instructions further cause the information handling system to determine that the user is not proximate to the information handling system via at least one of a passive infrared device and a gesture determining device.

16. The computer-readable non-transitory memory medium of claim 13, wherein, to determine that the user is not present, the processor instructions further cause the information handling system to:

determine that a key of a keyboard of the information handling system has not been actuated within a first amount of time transpiring;

determine that a pointing device of the information handling system has not been utilized within a second amount of time transpiring;

determine, via a motion sensor of the information handling system, that the information handling has been stationary for a third amount of time transpiring; or determine that a lid of the information handling system is in a closed position for a fourth amount of time transpiring.

17. The computer-readable non-transitory memory medium of claim 13, wherein, to save the state of the information handling system to the non-volatile memory medium, the processor instructions further cause the information handling system to save at least one of a state of an operating system or save one or more states of respective one or more applications.

18. The information handling system of claim 1, wherein the instructions further cause the information handling system to:

after shutting down the information handling system, receive broadcast network traffic;

in response to receiving the broadcast network traffic, power up the information handling system; and restore the state of the information handling system from the non-volatile memory medium.

19. The method of claim 7, further comprising:

after the shutting down the information handling system, receiving broadcast network traffic;

in response to the receiving the broadcast network traffic, powering up the information handling system; and restoring the state of the information handling system from the non-volatile memory medium.

20. The computer-readable non-transitory memory medium of claim 13, wherein the processor instructions further cause the information handling system to:

after shutting the information handling system, receive broadcast network traffic;

in response to receiving the broadcast network traffic, power up the information handling system; and restore the state of the information handling system from the non-volatile memory medium.

* * * * *